US00RE47324E

(19) United States
(12) Reissued Patent
Wei

(10) Patent Number: US RE47,324 E
(45) Date of Reissued Patent: Mar. 26, 2019

(54) DATA ENCRYPTION SYSTEMS AND METHODS

(71) Applicant: Transpacific IP Ltd., Taipei (TW)

(72) Inventor: Bo-Er Wei, Taipei (TW)

(73) Assignee: Transpacific IP Ltd., Taipei (TW)

(21) Appl. No.: 15/399,653

(22) Filed: Jan. 5, 2017

Related U.S. Patent Documents

Reissue of:
(64) Patent No.: 8,929,555
Issued: Jan. 6, 2015
Appl. No.: 10/997,357
Filed: Nov. 23, 2004

(30) Foreign Application Priority Data

Sep. 22, 2004 (TW) ..... 93128681 A

(51) Int. Cl.
*G06F 12/14* (2006.01)
*G06F 21/10* (2013.01)
*H04L 9/08* (2006.01)

(52) U.S. Cl.
CPC ..... *G06F 12/1408* (2013.01)

(58) Field of Classification Search
CPC ..... H04L 9/0836; H04L 9/0861; H04L 9/14; H04L 63/0478; H04L 9/00; G06F 21/10; G06F 21/62; G06F 21/6209; G06F 21/6218; G06F 2221/2107
USPC ..... 380/284; 713/165
See application file for complete search history.

(56) References Cited

U.S. PATENT DOCUMENTS 6,477,252 B1 11/2002 Faber et al.
6,810,387 B1 * 10/2004 Yim ..... 705/57
6,836,483 B1 * 12/2004 Lee ..... 370/395.31
7,533,275 B2 * 5/2009 Nakano ..... 713/193
2003/0163737 A1 * 8/2003 Roskind ..... 713/201
2004/0230489 A1 * 11/2004 Goldthwaite ..... G06K 7/0004 705/26.1
2005/0097332 A1 * 5/2005 Imai ..... 713/176
2005/0101342 A1 * 5/2005 Chuang ..... H04B 1/3805 455/550.1
2005/0114664 A1 * 5/2005 Davin ..... H04L 9/12 713/170
2005/0208891 A1 * 9/2005 Khare et al. ..... 455/39
2005/0273609 A1 * 12/2005 Eronen ..... H04L 63/0428 713/171

(Continued)

FOREIGN PATENT DOCUMENTS

CN 1282161 1/2001

OTHER PUBLICATIONS

Exhibit 2001 Transpacific IP, from IPR2015-01912, Disclaimer of claims 1, 7, and 13-15 of U.S. Pat. No. 8,929,555 (the subject patent of this reissue application), 2 pages, filed Jun. 29, 2016 in Case No. IPR2015-01912.

(Continued)

*Primary Examiner* — Minh Dieu Nguyen
(74) *Attorney, Agent, or Firm* — Knobbe Martens Olson & Bear LLP

(57) ABSTRACT

Data encryption systems and methods. The system includes a storage device storing data and an encryption/decryption module. The encryption/decryption module randomly generates a device key seed according to the occurrence time of a specific operation or the interval between two specific operations on the storage device, and applies the device key seed to data encryption.

23 Claims, 2 Drawing Sheets

(56) References Cited

U.S. PATENT DOCUMENTS

2007/0050871 A1* 3/2007 Mashhour ..... G06Q 20/04 705/65

OTHER PUBLICATIONS

Office Action, dated Feb. 6, 2009, for Chinese Patent Application No. 2004100865489.
Office Action, dated Jul. 31, 2009, for Chinese Patent Application No. 2004100865489.
Office Action, dated Jan. 29, 2010 for Chinese Patent Application No. 2004100865489.
Petition for Inter Partes Review of U.S. Pat. No. 8,929,555, *Great West Casualty Company et al,* v. *Transpacific IP | Ltd,* Inter Partes Review No. IPR2015-01912, dated Sep. 18, 2015, 64 pages.
Patent Owner's Preliminary Response to Petition for Inter Partes Review, *Great West Casualty Company et al.,* v. *Transpacific IP | Ltd,* filed Dec. 28, 2015, Case No. IPR2015-01912 for U.S. Pat. No. 8,929,555, 22 pages.
Decision Institution of Inter Partes Review, *Great West Casualty Company et al,* v. *Transpacific IP | Ltd,* entered Mar. 22, 2016, Case IPR2015-01912 for U.S. Pat. No. 8,929,555 B2, 20 pages.
Judgment and Final Written Decision, entered Aug. 24, 2016, Case IPR2015-01912 for U.S. Pat. No. 8,929,555 B2, 5 pages.
Exhibit 1002, 8929555 File History, 448 pages, filed Sep. 29, 2015 in Case No. IPR2015-01912.
Exhibit 1003, Declaration of Bruce Schneier Regarding U.S. Pat. No. 8,929,555 for Inter Partes Review No. IPR2015-01912, 70 pages, filed Sep. 29, 2015 in Case No. IPR2015-01912.
Exhibit 1004, Bruce Schneier CV, 60 pages, filed Sep. 29, 2015 in Case No. IPR2015-01912.
Exhibit 1005, U.S. Pat. No. 7,545,931 (Dillaway), 15 pages, filed Sep. 29, 2015 in Case No. IPR2015-01912.
Exhibit 1006, Random c.—A Strong Random Number Generator, Version 1.00, 25 pages, filed Sep. 29, 2015 in Case No. IPR2015-01912.
Exhibit 1007, Castejon-Amendo, *Extracting Randomness from External Interrupts* (2003), 8 pages, filed Sep. 29, 2015 in Case No. IPR2015-01912.
Exhibit 1008, U.S. Pat. No. 6,731,952 (Schaeffer et al.), 11 pages, filed Sep. 29, 2015 in Case No. IPR2015-01912.
Exhibit 1009, U.S. Pat. No. 6,671,808 (Abbott et al.), 19 pages, filed Sep. 29, 2015 in Case No. IPR2015-01912.
Exhibit 1010, U.S. Pat. No. 7,085,707 (Milner), 17 pages, filed Sep. 29, 2015 in Case No. IPR2015-01912.
Exhibit 1011, BITCO U.S. Pat. No. 8,929,555 Patent Claim Chart (Claims 1,7, 13-15), 35 pages, filed Sep. 29, 2015 in Case No. IPR2015-01912.
Exhibit 1012, Menezes et al., Handbook of Applied Cryptography, 1996 (Chapter 5), 23 pages, filed Sep. 29, 2015 in Case No. IPR2015-01912.
Exhibit 1013, Microsoft Computer Dictionary, 5th Edition (2002), 4 pages, filed Sep. 29, 2015 in Case No. IPR2015-01912.
Exhibit 1014, U.S. Pat. No. 6,496,891 (Cluff et al.), 21 pages, filed Sep. 29, 2015 in Case No. IPR2015-01912.
Exhibit 1015, Rosenthal, *Interrupts might seem basic, but many programmers still avoid them* (May, 1995), 3 pages, filed Sep. 29, 2015 in Case No. IPR2015-01912.
Exhibit 1016, U.S. Pat. No. 7,599,976 (Logue et al.), 10 pages, filed Sep. 29, 2015 in Case No. IPR2015-01912.
Exhibit 1017, Gutmann, *Software Generation of Practically Strong Random Numbers* (1998), 17 pages, filed Sep. 29, 2015 in Case No. IPR2015-01912.
Exhibit 1018, Viega, *Network Security with OpenSSL* (2002), 388 pages, filed Sep. 29, 2015 in Case No. IPR2015-01912.
Exhibit 1019, U.S. Patent Application Publication 2011/0053712 (Yoseloff et al.), 15 pages, filed Sep. 29, 2015 in Case No. IPR2015-01912.
Exhibit 1020, Rubini et al, Linux Device Drivers (2001), 24 pages, filed Sep. 29, 2015 in Case No. IPR2015-01912.
Exhibit 1021, U.S. Pat. No. 8,010,726 (Francis), 17 pages, filed Sep. 29, 2015 in Case No. IPR2015-01912.
Exhibit 1022, U.S. Pat. No. 5,594,905 (Mital), 13 pages, filed Sep. 29, 2015 in Case No. IPR2015-01912.
Exhibit 1023, The Linus Kernel Archives dated Sep. 15, 2015, 3 pages, filed Sep. 29, 2015 in Case No. IPR2015-01912.
Exhibit 1024, IV Preliminary Claim Constructions (15cv00059), 9 pages, filed Sep. 29, 2015 in Case No. IPR2015-01912.
Exhibit 1025, Moon et al., Essence of Distributed Work—The Case of the Linux Kernel (2000), 15 pages, filed Sep. 29, 2015 in Case No. IPR2015-01912.
Exhibit 1026, *About Linux Kernel,* The Linux Kernel Archives, 2 pages, filed Sep. 29, 2015 in Case No. IPR2015-01912.
Exhibit 1027, Toxen Real World Linux Security (2003), Revised and Updated Second Edition, 3 pages, filed Sep. 29, 2015 in Case No. IPR2015-01912.
Exhibit 1028, Advanced Linux Programming (2001), 3 pages, filed Sep. 29, 2015 in Case No. IPR2015-01912.
Exhibit 1029, IASTED Proceeding Prices, 2 pages, filed Sep. 29, 2015 in Case No. IPR2015-01912.
Exhibit 1030, IV First Amended Complaint for Patent Infringement (15c00059), 12 pages, filed Sep. 29, 2015 in Case No. IPR2015-01912.
Exhibit 1031, Declaration of Vernon Winters in Support of PHV Motion, 3 pages, filed Nov. 16, 2015 in Case No. IPR2015-01912.
Exhibit 1031, Supplemental Declaration of Bruce Schneier, 7 pages, filed Apr. 19, 2016 in Case No. IPR2015-01912.
Exhibit 1032, Index of /pub/linux/kernel/v2.0, 6 pages, filed Apr. 19, 2016 in Case No. IPR2015-01912.
Exhibit 1033, Affidavit of Christopher Butler, 3 pages, filed Apr. 19, 2016 in Case No. IPR2015-01912.
Exhibit 1034, Attachment A to Affidavit of Chris Butler, Index of /pub/linux/kernel/v2.0, 32 pages, filed Apr. 19, 2016 in Case No. IPR2015-01912.
Exhibit 1036, Declaration of Scott Border in Support of Petitioners Motion for PHV Admission, 4 pages, filed Apr. 22, 2016 in Case No. IPR2015-01912.
Original Complaint for Patent Infringement, *Intellectual Ventures II LLC,* v. *BITCO General Insurance Corporation et al.,* filed in Case No. 6:15-cv-00059-JRG, filed on Jan. 20, 2015, 100 pages, [Document 1].
Original Complaint for Patent Infringement, *Intellectual Ventures II LLC,* v. *Great West Casualty Company,* filed in Case No. 6:15-cv-00060-JRG, on Jan. 20, 2015, 100 pp., [Document 1].
Great West Casualty Company's Answer, Affirmative Defenses, and Counterclaims, *Intellectual Ventures II LLC,* v. *Great West Casualty Company,* filed in Case No. 6:15-cv-00060-JRG on Mar. 18, 2015, 12 pages, [Document 18].
BITCO General Insurance Corporation's and BITCO National Insurance Company's Answer, Affirmative Defenses, and Counterclaims, *Intellectual Ventures II LCC,* v. *BITCO General Insurance Corp. et al,* Case No. 6:15-cv-00059-JRG, filed on Mar. 18, 2015, 12 pages, [Document 19].
First Amended Complaint for Patent Infringement, *Intellectual Ventures II LLC,* v. *Great West Casualty Company,* Case No. 6:15-cv-00060-JRG, filed Apr. 9, 2015, 11 pages, [Document 23].
First Amended Complaint for Patent Infringement, *Intellectual Ventures II LLC,* v. *BITCO General Insurance Corp. et al,* Case No. 6:15-cv-00059-JRG, filed on Apr. 9, 2015, 12 pages, [Document 24].
Order, *Intellectual Ventures II LLC,* v. *BITCO/ Great West Casualty Company,* filed in Case No. 6:15-cv-00059-JRG, bearing both Case No. 6:15-cv-00059JPG and 6:15-cv-00060-JRG, filed on Apr. 30, 2015, 2 pages, [Document 33].
BITCO General Insurance Corporation's and BITCO National Insurance Company's Answer to IV's First Amended Complaint, Affirmative Defenses, and Counterclaims, *Intellectual Ventures II LLC,* v. *BITCO General Insurance Corp., et al,* Case No. 6:15-cv-00059-JRG, filed on May 11, 2015, 14 pages, [Document 37].
Great West Casualty's Company's Answer to IV's First Amended Complaint, Affirmative Defenses, and Counterclaims, *Intellectual*

(56) References Cited

OTHER PUBLICATIONS

*Ventures II LLC,* v. *Great West Casualty Company,* filed in Case No. 6:15-cv-00059-JRG bearing Case No. 6:15-cv-00060-JRG, filed on May 11, 2015, 14 pages, [Document 38].
Plaintiff Intellectual Ventures II LLC's Answer to Bitco General Insurance Corporation and Bitco National Insurance Company's First Amended Counterclaims, *Intellectual Ventures II LLC,* v. *BITCO General Insurance Corporation et al.,* filed in Case No. 6:15-cv-00059-JRG, on May 26, 2015, 6 pages [Document 42].
Plaintiff Intellectual Ventures II LLC's Answer to Great West Casualty Company's First Amended Counterclaims, *Intellectual Ventures II LLC,* v. *Great West Casualty Company,* filed in Case No. 6:15-cv-00059-JRG bearing Case No. 6:15-cv-00060-JRG, filed on May 26, 2015, 6 pages, [Document 43].
Order Dismissing Certain Claims, *Intellectual Ventures II LLC,* v. *Great West Casualty Company,* filed in Case No. Case No. 6:15-cv-00060-JRG filed May 11, 2016, bearing both Case No. 6:15-cv-59-JRG(Lead Case) and 6:15-cv-60JRG, 2 pages, [Document 60].
Memorandum Opinion and Order, *Intellectual Ventures II LLC,* v. *Great West Casualty Company,* filed in Case No. 6:15-cv-00060-JRG on May 12, 2016, bearing both Case No. 6:15-cv-59 (Lead Case) and 6:15-cv-60, 7 pages, [Document 61].
Plaintiff Intellectual Ventures II, LLC's Opening Claim Construction Brief, filed in Case No. 6:15-cv-00059-JRG bearing both Case No. 6:15-cv-59-JRG (Lead Case) and 6:15-cv-60-JRG, filed Oct. 28, 2015, 126 pages, [Document 91].
Responsive Claim Construction Brief of BITCO General Insurance Corp. and BITCO National Insurance Co., and of Great West Casualty Company Regarding U.S. Pat. Nos. 8,929,555 and 7,516,177, *Intellectual Ventures II LLC,* v. *BITCO et al,* filed in Case No. 6:15-cv-00059, bearing both Case Nos. 6:15-cv-59-JRG (Lead Case) and Case No. 6:15-cv-60-JRG, filed on Nov. 11, 2015, 154 pages, [Document 99].
Unapposed Motion by BITCO General Insurance Corp., Bitco National Insurance Co., and Great West Casualty Company to File a Corrected Responsive Claim Construction Brief, *Intellectual Ventures II LLC,* v. *BITCO General Insurance Corp., et al,* filed in Case No, 6:15-cv-00059-JRG , bearing both Case Nos. 6:15-cv-59-JRG (Lead Case) and 6:15-cv-60-JRG, filed on Nov. 16, 2015, 88 gages, [Document 101].
Order Granting Unopposed Motion to File a Corrected Responsive Claim Construction Brief, *Intellectual Ventures II LLC,* v. *BiTCO General Insurance Corp et al.,* filed in Case No. 6:15-cv-00059-JRG, bearing both Case Nos. 6:15-cv-59-JRG (Lead Case) and 6:15-cv-60-JRG, filed on Nov. 17, 2015, 2 pages, [Document 102].
Plaintiff Intellectual Ventures II, LLC's Reply Claim Construction Brief, *Intellectual Ventures II LLC,* v. *BiTCO General Insurance Corp. et al.,* filed in Case No. 6:15-cv-00059-JRG, bearing both Case Nos. 6:15-cv-59-JRG (Lead Case) and 6:15-cv-602-JRG, filed on Nov. 18, 2015, 53 pages, [Document 103].
[Proposed] Sur-Reply Claim Construction Brief of BITCO General Insurance Corp., and BITCO National Insurance Co., and of Great West Casualty Company Regarding U.S. Pat. Nos. 8,929,555 and 7,516,177, *Intellectual Ventures II LLC,* v. *BITCO General Insurance Corp., et al.,* filed in Case No. 6:15-cv-00059-JRG, bearing both Case Nos. 6:15-cv-59-JRG (Lead Case) and 6:15-cv-60-JRG, filed on Nov. 23, 2015, 11 pages, [Document 105].
Order Granting Unopposed Motion for Leave to File a 5-page Sur-Reply Claim Construction Brief, *Intellectual Ventures II LCC,* v. *BITCO General Insurance Corp. et al.,* filed in Case No. 6:15-cv-00059-JRG, bearing both Case Nos. 6:15-cv-59-JRG (Lead Case) and 6:15-cv-60-JRG, filed on Nov. 24, 2015, 2 pages, [Document 106].
Joint Claim Construction Chart Under P.R. 4-5(D), *Intellectual Ventures II LLC* v. *BITCO General Insurance Corp.,* filed in Case No. 6:15-cv-00059-JRG bearing Case Nos. 6:15-cv-59-JRG (Lead Case) and 6:15-cv-60-JRG, filed on Nov. 25, 2015, 28 pages, [Document 107].
Opposed Motion by BITCO General Insurance Corp., BITCO National Insurance Co., and Great West Casualty Company to File a Second Corrected Responsive Claim Construction Brief, *Intellectual Ventures II LLC,* v. *BITCO General Insurance Corp, et al.* filed in Case No 6:15-cv-00059-JRG, bearing both Case Nos. 6:15-cv-59-JRG (Lead Case) and 6:15-cv-60-JRG, filed on Dec. 8, 2015, 90 pages, [Document 110].
Transcript of Claim Construction Hearing Before the Honorable Judge Rodney Gilstrap, *Intellectual Ventures II LLC,* v. *BITCO General Insurance Corporation, et al.,* filed in Case No. 6:15-cv-00059-JRG, filed on Jan. 6, 2016, 77 pages, [Document 114].
Order Granting Motion to File Second Corrected Responsive Claim Construction Brief, *Intellectual Ventures II LLC,* v. *BITCO General Insurance Corp., et al.,* filed in Case No. 6:15-cv-00059-JRG, bearing both Case Nos. 6:15-cv-59-JRG (Lead Case) and 6:15-cv-60-JRG, filed on Jan. 6, 2016, 2 pages, [Document 115].
Memorandum Opinion and Order, *Intellectual Ventures II LLC,* v. *BITCO General Insurance Corp., et al,* filed in Case No. 6:15-cv-00059-JRG, bearing Case Nos. 6:15-cv-59 (Lead Case) and 6:15-cv-60, filed on Jan. 1, 2016, 56 pages [Document 116].
FRCP 12(c) Motion for Judgment on the Pleadings that the Remaining Asserted Claims of the Two Patents-In-Suit Claim Patent-Ineligible Abstract Ideas Under 35 USC 101, *Intellectual Ventures II LLC,* v. *BITCO General Insurance Corp. et al,* filed in Case No. 6:15-cv-00059-JRG, bearing both Case Nos. 6:15-cv-59-JRG (Lead Case) and 6:15-cv-60-JRG, filed on Feb. 25, 2016, 30 pages, [Document 124].
Plaintiff Intellectual Ventures II, LLC's Response to Defendants' Motion for Judgment on the Pleadings, *Intellectual Ventures II LLC,* v. *BITCO General Insurance Corp. et al,* filed in Case No. 6:15-cv-00059-JRG, bearing both Case Nos. 6:15-cv-59-JRG (Lead Case) and 6:15-cv-60-JRG, file don Mar. 14, 2016, 66 pages [Document 126].
Motion for Stay Pending Resolution of Inter Partes Review of the Patents-In-Suit, *Intellectual Ventures II LLC,* v. *BITCO General Insurance Corp., et al,* filed in Case No. 6:15-cv-00059-JRG, bearing both Case Nos. 6:15-cv-59-JRG (Lead Case) and 6:15-cv-60-JRG, filed on Mar. 29, 2016, 435 pages, [Document 131].
Plaintiff Intellectual Ventures II, LLC's Sur-Reply in Response to Defendants' Motion for Judgment on the Pleadings, *Intellectual Ventures II LLC,* v. *BITCO General Insurance Corp. et al.,* filed in Case No. 6:15-cv-00059-JRG, bearing both Case Nos. 6:15-cv-59-JRG (Lead Case) and 6:15-cv-60-JRG, filed on Apr. 11, 2016, 13 pages, [Document 137].
Plaintiff's Response to Defendants' Motion for Stay Pending Resolution of Inter Partes Review of the Patents-In-Suit, *Intellectual Ventures II LLC,* v. *BITCO General Insurance Corp., et al,* filed in Case No. 6:15-cv-00059-JRG, filed on Apr. 15, 2016, 323 pages, [Document 138].
Joint Stipulation of Dismissal of Certain Claims, *Intellectual Ventures II LLC,* v. *BITCO General Insurance Corp. et al,* filed in Case No. 6:15-cv-00059-JRG, bearing both Case Nos. 6:15-cv-59-JRG (Lead Case) and 6:15-cv-60-JRG, filed on May 11, 2016, 6 pages, [Document 143].
Order Dismissing Certain Claims, *Intellectual Ventures II LLC,* v. *BITCO General Insurance Corp. et al,* filed in Case No. 6:15-cv-00059-JRG, bearing both Case Nos. 6:15-cv-59-JRG (Lead Case), and 6:15-cv-60-JRG, filed on May 11, 2016, 2 pages, [Document 144].
Memorandum Opinion and Order, *Intellectual Ventures II LLC,* v. *BITCO General Insurance Corporation, et al.,* filed in Case No. 6:15-cv-00059-JRG bearing both Case No. 6:15-cv-59 (Lead Case) and 6:15-cv-60, filed on May 12, 2016, 7 pages, [Document 145].
Order, *Intellectual Ventures II LLC,* v. *BITCO General Insurance Corporation, et al.,* filed in Case No. 6:15-cv-00059-JRG, bearing both Case No. 6:15-cv-59 (Lead Case) and 6:15-cv-60, filed Feb. 6, 2017, 2 pages, [Document 150].

* cited by examiner

DATA ENCRYPTION SYSTEMS AND METHODS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

The present disclosure relates generally to data protection mechanisms, and, more particularly, to data encryption systems and methods.

Computers can be used to remotely authenticate and authorize digital data. Network applications are also convenient, but data protection is critical.

Conventionally, data, such as authentication data can be protected using a hardware or software based fixed or non-fixed key encryption. Authentication data, for example, can be encrypted according to public key cryptography before transmission to a service provider. Upon reception of the encrypted data, the service provider decrypts the encrypted data to obtain the authentication data, and authorize a user.

If the encryption is hardware based, additional device cost is incurred. Additionally, the authentication data is always stored in a portable device. The design of the device will become complicated due to the size limitations. If the encryption employs a fixed key, the same authentication data may result in the same encrypted data. That is, the storage device storing the authentication data can be easily imitated by a simulator or by sniffing and re-transmitting the encrypted data. If the encryption employs a non-fixed key, the non-fixed key is generated by searching for a key in a database. The database storing the file is still at risk. Further, in non-fixed key encryption, the key must be distributed to both connected sides and the key may be sniffed during transmission.

SUMMARY

Data encryption systems and methods are provided. In an exemplary embodiment of a data encryption system, the system comprises a storage device comprising data D and an encryption/decryption module. The encryption/decryption module randomly generates a device key seed $S_d$ according to the time of a specific operation or the interval between two specific operations on the storage device, and applies the device key seed $S_d$ and a seed generated by a host to data encryption.

An embodiment of the system further comprises a host to receive the device key seed $S_d$ from the storage device. The host generates a host key seed $S_h$, generates a first key $K_n$ according to the device key seed $S_d$, encrypts the host key seed $S_h$ using the first key $K_n$, and transmits the encrypted host key seed $K_n(S_h)$ to the storage device. The storage device generates the first key $K_n$ according to the device key seed $S_d$, and decrypts the encrypted host key seed $K_n(S_h)$ using the first key $K_n$ to obtain the host key seed $S_h$. The storage device further generates a second key $K_{n+1}$ according to the host key seed $S_h$ and the device key seed $S_d$, and encrypts the data D using the second key $K_{n+1}$.

The host further receives the encrypted data $K_{n+1}(D)$, generates the second key $K_{n+1}$ according to the host key seed $S_h$ and the device key seed $S_d$, and decrypts the encrypted data $K_{n+1}(D)$ using the second key $K_{n+1}$ to obtain the data D.

The specific operation is received on the storage device, and corresponds to a control transmission or normal data transmission defined by USB (Universal Serial Bus). The control transmission comprises status getting, feature clearing, feature setting, address setting, descriptor getting, descriptor setting, configuration getting, configuration setting, interface getting, interface setting, or frame synchronization.

The host key seed is randomly generated and difficult to be predicted and amended. The generation method for the host key seed, however, is not limited. The system generates the host key seed according to the operation capability of the host. In some embodiments, the system generates the host key seed using a complex algorithm requiring higher operational requirement, or according to the interval between the execution of an application and the reception of the device key seed with less operational requirements.

In an exemplary embodiment of a data encryption method, a device key seed $S_d$ is randomly generated according to the time of a specific operation or the interval between two specific operations on the storage device. The device key seed $S_d$ is applied to data encryption on a storage device.

The device key seed $S_d$ is further transmitted from the storage device to a host. In the host, a host key seed $S_h$ is generated, a first key $K_n$ is generated according to the device key seed $S_d$, the host key seed $S_h$ is encrypted using the first key $K_n$, and the encrypted host key seed $K_n(S_h)$ is transmitted to the storage device. After reception of the encrypted host key seed $K_n(S_h)$, the storage device generates the first key $K_n$ according to the device key seed $S_d$, and decrypts the encrypted host key seed $K_n(S_h)$ using the first key $K_n$ to obtain the host key seed $S_h$. The storage device then generates a second key $K_{n+1}$ according to the host key seed $S_h$ and the device key seed $S_d$, and encrypts the data D using the second key $K_{n+1}$.

The encrypted data $K_{n+1}(D)$ is further transmitted from the storage device to the host. The host generates the second key $K_{n+1}$ according to the host key seed $S_h$ and the device key seed $S_d$, and decrypts the encrypted data $K_{n+1}(D)$ using the second key $K_{n+1}$ to obtain the data D.

The specific operation is received on the storage device, and corresponds to a control transmission or normal data transmission defined by USB. The control transmission comprises status getting, feature clearing, feature setting, address setting, descriptor getting, descriptor setting, configuration getting, configuration setting, interface getting, interface setting, or frame synchronization.

The host key seed is randomly generated and difficult to be predicted and amended. The generation method for the host key seed, however, is not limited. The system generates the host key seed according to the operation capability of the host. In some embodiments, the system generates the host key seed using a complex algorithm requiring higher operational requirements, or according to the interval between the execution of an application and the reception of the device key seed with less operational requirements.

Data encryption methods may take the form of program code embodied in a tangible media. When the program code is loaded into and executed by a machine, the machine becomes an apparatus for practicing the disclosed method.

DESCRIPTION OF THE DRAWINGS

Data encryption systems and methods will become more fully understood by referring to the following detailed description with reference to the accompanying drawings, wherein.

DESCRIPTION

Figure 1:
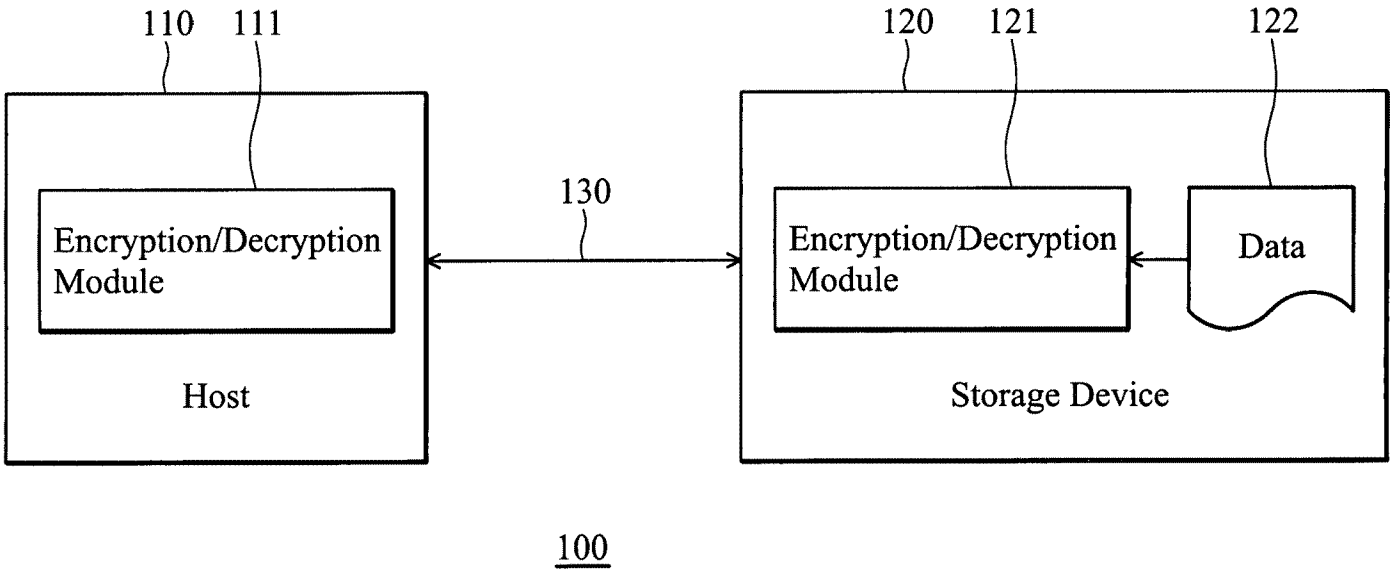
FIG. 1 is a schematic diagram illustrating an embodiment of a data encryption system.

Data encryption systems and methods are provided. FIG. 1 is a schematic diagram illustrating an embodiment of a data encryption system.

An embodiment of the data encryption system 100 comprises a host 110 and a storage device 120. The storage device 120 connects to the host 110 via a channel 130, such as a USB (Universal Serial Bus) transmission channel. The host 110 may be a computer system, an electronic schoolbag, a mobile device, such as a PDA, or other processor-based electronic devices. The host 110 comprises an encryption/decryption module 111, for generating host key seeds and keys, and performing encryption and decryption operations. The storage device 120 may be a mobile device, such as a mobile phone, USB handy disk, or a language learning machine. The storage device 120 comprises an encryption/decryption module 121, and data 122 requiring protection during transmission, such as authentication data for digital copyright control. The encryption/decryption module 121 may be implemented in software or hardware. To reduce cost, a software implementation may be the best choice. Similarly, the encryption/decryption module 121 generates device key seeds and keys, and performing encryption and decryption operations on the data 122.

Figure 2:
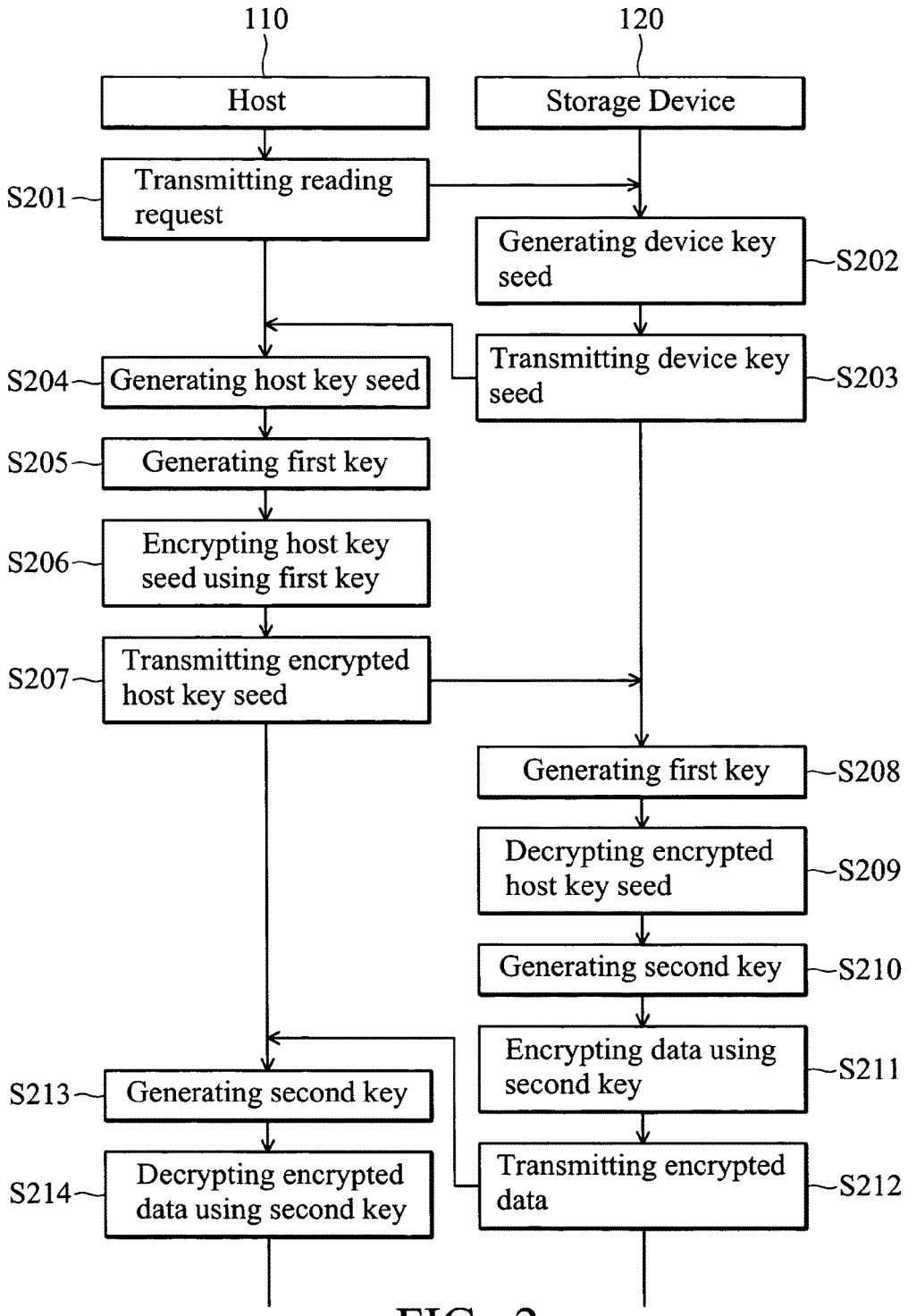
FIG. 2 is a flowchart showing an embodiment of a data encryption method.

FIG. 2 is a flowchart showing an embodiment of a data encryption method.

When an application (not shown in FIG. 1) executes on the host 110 and must read data 122 from the storage device 120, in step S201, the host 110 transmits a read data request to the storage device 120. When the storage device 120 receives the request, in step S202, a device key seed $S_d$ is randomly generated according to the time of a specific operation or the interval between two specific operations on the storage device 120, and in step S203, the device key seed $S_d$ is transmitted to the host 110. It is understood that if the device key seed $S_d$ is generated according to the interval between two specific operations, the two operations may be of different type.

The interval can be measured using the MCU (Micro Control Unit) tick number of the storage device 120. The specific operation is received on the storage device 120 from the host 110, and corresponds to a control transmission defined by USB. The control transmission comprises status getting, feature clearing, feature setting, address setting, descriptor getting, descriptor setting, configuration getting, configuration setting, interface getting, interface setting, or frame synchronization. The descriptors comprise device, configuration, interface, endpoint, and string descriptors. Additionally, the specific operation may be received on the storage device 120 from the host 110, and correspond to a normal data transmission defined by USB. For example, if a FIFO queue of the host 110 is 64 bytes, and each transmission with 64 bytes triggers a USB data transmission. If the host 110 transmits 198 bytes of data, the storage device 120 receives three USB data transmissions each of 64 bytes, and one USB data transmissions of 6 bytes. Each of the four USB data transmissions can be candidates for the specific operations. When each of the operations occurs, an interrupt is triggered to notify the MCU of the storage device 120 regarding the requirement of the operation, and the storage device 120 can obtain the system clock wherein the operation occurred.

After the host 110 receives the device key seed $S_d$, in step S204, a host key seed $S_h$ is generated. It is understood that the host key seed $S_h$ is randomly generated and difficult to be predicted and amended. The generation method for the host key seed $S_h$, however, is not limited. The host 110 generates the host key seed $S_h$ according to the operation capability of the host 110. In some embodiments, the host 110 generates the host key seed $S_h$ using a complex algorithm, or according to the interval between the execution of the application and the reception of the device key seed $S_d$. Then, in step S205, the host 110 generates a first key $K_n$ according to the device key seed $S_d$, in step S206, encrypts the host key seed $S_h$ using the first key $K_n$, and in step S207, transmits the encrypted host key seed $K_n(S_h)$ to the storage device 120.

It is understood that a key seed can be performed with a predetermined number of operations, to thus generate the key for software encryption. The predetermined operations are dependent on different software encryptions. For example, if both the host key seed $S_h$ and the device key seed $S_d$ are 32 bits, a key with 8m bits is generated using following equation (in program language C):

$$F(S_h,S_d)=(S_h*S_d)\&0xff+((S_h<<8)*S_d)\&0xff00+((S_h<<16)*S_d)\&0xff0000+((S_h<<24)*S_d)\&0xff000000+((S_h+S_d)\&0xff+((S_d<<8)*S_h)\&0xff00+((S_d<<16)*S_h)\&0xff0000+(S_d<<24)*S_h)\&0xff000000)<<32.$$

m is an integer within 1 to 8. That is, the key is the last 8m bits of $F(S_h, S_d)$. Additionally, if any of $S_h$ and $S_d$ is not present, the absentee can be replaced by a predefined constant C with 32 bits. The above equation is one example, the method for generating the key is not limited thereto.

The encryption mechanism can be any symmetric encryption, and the complexity and security level of a software encryption method can be selected according to hardware and security requirements. For example, the encryption can be performed by left rotating r bits of authentication data. The value of r is determined according to $K_n$ %64 ($K_n$ is a key generated using $F(S_h, S_d)$ in the n-th transmission). In some embodiments, TEA (Tiny Encryption Algorithm) can be employed. In TEA, a key with 32 bits is obtained from the last 32 bits of $F(S_h, S_d)$. Similarly, the above encryption mechanisms are not limited thereto.

After reception of the encrypted host key seed $K_n(S_h)$, in step S208, the storage device 120 generates the first key $K_n$ according to the device key seed $S_d$, and in step S209, decrypts the encrypted host key seed $K_n(S_h)$ using the first key $K_n$ to obtain the host key seed $S_h$. Then, in step S210, the storage device 120 generates a second key $K_{n+1}$ according to the host key seed $S_h$ and the device key seed $S_d$, in step S211, encrypts the data D using the second key $K_{n+1}$, and in step S212, transmits the encrypted data $K_{n+1}(D)$ to the host 110.

After reception of the encrypted data $K_{n+1}(D)$, in step S213, the host 110 generates the second key $K_{n+1}$ according to the host key seed $S_h$ and the device key seed $S_d$, and in step S214, decrypts the encrypted data $K_{n+1}(D)$ using the second key $K_{n+1}$ to obtain the data D. The data D can be transmitted to the application for further processing, such as authentication.

Data encryption methods, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

[1. A data encryption system, comprising:

a storage device adapted to store data D, the storage device including:

an encryption/decryption module adapted to randomly generate a device key seed $S_d$ according to a time interval between two specific operations on the storage device, and adapted to apply the generated device key seed $S_d$ to data encryption of the data D, wherein the storage device is adapted to randomly generate the device key seed $S_d$ in response to interrupts that notify the storage device of occurrence of the two specific operations.]

2. [The system of claim 1, further] *A data encryption system,* comprising:

*a storage device adapted to store data D, the storage device including:*

*an encryption/decryption module adapted to randomly generate a device key seed $S_d$ according to a time interval between two specific operations on the storage device, and adapted to apply the generated device key seed $S_d$ to data encryption of the data D,*

*wherein the storage device is adapted to randomly generate the device key seed $S_d$ in response to interrupts that notify the storage device of occurrence of the two specific operations, and* a host adapted to receive the generated device key seed $S_d$ from the storage device, to generate a host key seed $S_h$, to generate a first key $K_n$ according to the received device key seed $S_d$, to encrypt the generated host key seed $S_h$ using the generated first key $K_n$, and to transmit the encrypted host key seed $K_n(S_h)$ to the storage device, wherein the storage device is further adapted to generate the first key $K_n$ according to the device key seed $S_d$, to decrypt the transmitted encrypted host key seed $K_n(S_h)$ using the generated first key $K_n$ to obtain the host key seed $S_h$, to generate a second key $K_{n+1}$ according to the obtained host key seed $S_h$ and the device key seed $S_d$, and to encrypt the data D using the generated second key $K_{n+1}$.

3. The system of claim 2 wherein the host is further adapted to receive the encrypted data $K_{n+1}(D)$ from the storage device, to generate the second key $K_{n+1}$ according to the host key seed $S_h$ and the device key seed $S_d$, and to decrypt the encrypted data $K_{n+1}(D)$ using the generated second key $K_{1+1}$ to obtain the data D.

[4. The system of claim 1 wherein one of the specific operations is received on the storage device, and corresponds to a control transmission defined by USB (Universal Serial Bus).]

[5. The system of claim 4 wherein the control transmission includes at least one of status getting, feature clearing, feature setting, address setting, descriptor getting, descriptor setting, configuration getting, configuration setting, interface getting, interface setting, or frame synchronization.]

6. [The system of claim 1] *A data encryption system, comprising:*

*a storage device adapted to store data D, the storage device including:*

*an encryption/decryption module adapted to randomly generate a device key seed $S_d$ according to a time interval between two specific operations on the storage device, and adapted to apply the generated device key seed $S_d$ to data encryption of the data D,*

*wherein the storage device is adapted to:*

*randomly generate the device key seed $S_d$ in response to interrupts that notify the storage device of occurrence of the two specific operations,*

*use the device key seed $S_d$ to create a first encryption key,*

*decrypt an encrypted host key seed $S_h$ using the first encryption key,*

*use the host key seed $S_h$ to generate a second encryption key, and*

*encrypt the data D using the second encryption key;* wherein one of the specific operations is received on the storage device, and corresponds to a normal data transmission defined by USB (Universal Serial Bus).

[7. A data encryption method, comprising:

randomly generating a device key seed $S_d$ according a time interval between two specific operations on a storage device; and applying the generated device key seed $S_d$ to data encryption of data D, wherein the device key seed $S_d$ is said randomly generated in response to interrupts that notify the storage device of occurrence of the two specific operations.]

8. [The method of claim 7, further] *A data encryption method,* comprising:

*randomly generating a device key seed $S_d$ according a time interval between two specific operations on a storage device; and*

*applying the generated device key seed $S_d$ to data encryption of data D,*

*wherein the device key seed $S_d$ is said randomly generated in response to interrupts that notify the storage device of occurrence of the two specific operations;* transmitting by the storage device the generated device key seed $S_d$ to a host;

receiving by the storage device from the host an encrypted host key seed $K_n(S_h)$, wherein $S_h$ is a host key seed generated by the host and $K_n$ is a first key generated by the host according to the device key seed $S_d$ transmitted by the storage device;

generating by the storage device the first key $K_n$ according to the device key seed $S_d$;

decrypting by the storage device the received encrypted host key seed $K_n(S_h)$ using the generated first key $K_n$ to obtain the host key seed $S_h$;

generating by the storage device a second key $K_{n+1}$ according to the obtained host key seed $S_h$ and the device key seed $S_d$; and encrypting by the storage device the data D using the generated second key $K_{n+1}$.

9. The method of claim 8, further comprising:

transmitting by the storage device the encrypted data $K_{n+1}(D)$ to the host so as to enable the host to:

generate the second key $K_{n+1}$ according to the host key seed $S_h$ and the device key seed $S_d$ in the host; and decrypt the encrypted data $K_{n+1}(D)$ using the generated second key $K_{1+1}$ to obtain the data D.

10. [The method of claim 7] *A data encryption method comprising:*

*randomly generating a device key seed $S_d$ according a time interval between two specific operations on a storage device, wherein the device key seed $S_d$ is randomly generated in response to interrupts that notify the storage device of occurrence of the two specific operations;*

*using the device key seed $S_d$ to create a first encryption key,*

*decrypting an encrypted host key seed $S_h$ using the first encryption key,*

*using the host key seed $S_h$ to generate a second encryption key,*

*encrypting data using the second encryption key, and*

*transmitting the encrypted data to another device;* wherein one of the specific operations is received on the storage device, and corresponds to a control transmission defined by USB (Universal Serial Bus).

11. The method of claim 10 wherein the control transmission includes at least one of status getting, feature clearing, feature setting, address setting, descriptor getting, descriptor setting, configuration getting, configuration setting, interface getting, interface setting, or frame synchronization.

12. The method of claim 7 wherein one of the specific operations is received on the storage device, and corresponds to a normal data transmission defined by USB (Universal Serial Bus).

[13. The system of claim 1 wherein the encryption/decryption module is further adapted to randomly generate the device key seed $S_d$ according to an occurrence time of one of the specific operations as obtained from a clock.]

[14. The method of claim 7, further comprising randomly generating the device key seed $S_d$ according to an occurrence time of one of the specific operations as obtained from a clock.]

[15. A tangible non-transitory computer-readable medium having stored thereon, computer-executable instructions that, if executed by a computing device, cause the computing device to perform a method comprising:

randomly generating a device key seed $S_d$ according a time interval between two specific operations on a storage device; and applying the generated device key seed $S_d$ to data encryption of data D, wherein the device key seed $S_d$ is said randomly generated in response to interrupts that notify the storage device of occurrence of the two specific operations.]

16. [The] *A* tangible *non-transitory* computer-readable medium [of claim 15 wherein the] *having stored thereon* computer-executable instructions *that*, if executed by [the] *a* computing device, cause the computing device to perform [the] *a* method [that further comprises] *comprising*:

*randomly generating a device key seed $S_d$ according a time interval between two specific operations on a storage device;*

*applying the generated device key seed $S_d$ to data encryption of data D,*

*wherein the device key seed $S_d$ is said randomly generated in response to interrupts that notify the storage device of occurrence of the two specific operations;* transmitting by the storage device the generated device key seed $S_d$ to a host;

receiving by the storage device from the host an encrypted host key seed $K_n(S_h)$, wherein $S_h$ is a host key seed generated by the host and $K_n$ is a first key generated by the host according to the device key seed $S_d$ transmitted by the storage device;

generating by the storage device the first key $K_n$ according to the device key seed $S_d$;

decrypting by the storage device the received encrypted host key seed $K_h(S_h)$ using the generated first key $K_n$ to obtain the host key seed $S_h$;

generating by the storage device a second key $K_{n+1}$ according to the obtained host key seed $S_h$ and the device key seed $S_d$; and encrypting by the storage device the data D using the generated second key $K_{n+1}$.

17. The tangible *non-transitory* computer-readable medium of claim 16 wherein the computer-executable instructions, if executed by the computing device, cause the computing device to perform the method that further comprises:

transmitting by the storage device the encrypted data $K_{n+1}(D$ to the host so as to enable the host to:

generate the second key $K_{n+1}$ according to the host key seed $S_h$ and the device key seed $S_d$ in the host; and decrypt the encrypted data $K_{n+1}(D)$ using the generated second key $K_{n+1}$ to obtain the data D.

18. A tangible *non-transitory* computer-readable medium having stored thereon, computer-executable instructions that, if executed by a computing device, cause the computing device to perform a method comprising:

sending by a host a request for data D to a storage device, wherein the storage device randomly generates a device key seed $S_d$ according a time interval between two specific operations on the storage device;

receiving by the host the generated device key seed $S_d$;

generating by the host a host key seed $S_h$;

generating by the host a first key $K_n$ according to the received device key seed $S_d$;

encrypting by the host the host key seed $S_h$ using the generated first key $K_n$; and transmitting by the host the encrypted host key seed $K_n(S_h)$ to the storage device to enable the storage device to:

generate the first key $K_n$ according to the device key seed $S_d$;

decrypt the transmitted encrypted host key seed $K_n(S_h)$ using the generated first key $K_n$ to obtain the host key seed $S_h$;

generate a second key $K_{n+1}$ according to the obtained host key seed $S_h$ and the device key seed $S_d$; and encrypt the data D using the generated second key $K_{n+1}$ to obtain encrypted data $K_{n+1}(D)$.

19. The tangible *non-transitory* computer-readable medium of claim 18 wherein the computer-executable instructions, if executed by the computing device, cause the computing device to perform the method that further comprises:

receiving by the host the encrypted data $K_{n+1}$ (D);

generating by the host the second key $K_{n+1}$ according to the host key seed $S_h$ and the device key seed $S_d$; and decrypting by the host the encrypted data $K_{n+1}(D)$ using the generated second key $K_{n+1}$ to obtain the data D.

20. The tangible *non-transitory* computer-readable medium of claim 18 wherein the device key seed $S_d$ is also randomly generated by the storage device according to an occurrence time of one of the specific operations as notified by an interrupt.

21. A host apparatus, comprising:

means for sending a request for data D to a storage device, wherein the storage device randomly generates a device key seed $S_d$ according a time interval between two specific operations on the storage device;

encryption/decryption means for:

receiving the generated device key seed $S_d$;

generating a host key seed $S_h$;

generating a first key $K_n$ according to the received device key seed $S_d$;

encrypting the host key seed $S_h$ using the generated first key $K_n$; and transmitting the encrypted host key seed $K_n(S_h)$ to the storage device to enable the storage device to:

generate the first key $K_n$ according to the device key seed $S_d$;

decrypt the transmitted encrypted host key seed $K_n(S_h)$ using the generated first key $K_n$ to obtain the host key seed $S_h$;

generate a second key $K_{n+1}$ according to the obtained host key seed $S_h$ and the device key seed $S_d$; and encrypt the data D using the generated second key $K_{n+1}$ to obtain encrypted data $K_{n+1}(D)$.

22. The host apparatus of claim 21 wherein the encryption/decryption means further is for:

receiving the encrypted data $K_{n+1}(D)$;

generating the second key $K_{n+1}$ according to the host key seed $S_h$ and the device key seed $S_d$; and decrypting the encrypted data $K_{n+1}(D)$ using the generated second key $K_{n+1}$ to obtain the data D.

23. The host apparatus of claim 21 wherein the device key seed $S_d$ is also randomly generated by the storage device according to an occurrence time of one of the specific operations as notified by an interrupt.

*24. A data encryption system, comprising:*

*a storage device including:*

*an encryption/decryption module adapted to randomly generate a device key seed $S_d$ according to a time interval between two specific operations on the storage device,*

*wherein the storage device is adapted to randomly generate the device key seed $S_d$ in response to interrupts that notify the storage device of occurrence of the two specific operations; and*

*a host adapted to receive the generated device key seed $S_d$ from the storage device, to generate a host key seed $S_h$ to generate a first key $K_n$ according to the received device key seed $S_d$, to encrypt the generated host key seed $S_h$ using the generated first key $K_n$, and to transmit the encrypted host key seed $K_n(S_h)$ to the storage device;*

*wherein the storage device is further adapted to generate the first key $K_n$ according to the device key seed $S_d$, to decrypt the transmitted encrypted host key seed $K_n(S_h)$ using the generated first key $K_n$ to obtain the host key seed $S_h$ to generate a second key $K_{n+1}$ according to the obtained host key seed $S_h$ and the device key seed $S_d$.*

*25. A data encryption method comprising:*

*generating, at a first device, a first seed based at least partly on a time interval between execution of an application and previous receipt of a second seed from a second device;*

*generating an encryption key based at least partly on the first seed at the first device;*

*encrypting the first seed at the first device to produce an encrypted first seed;*

*electronically transmitting the encrypted first seed to the second device to enable the second device to encrypt data for transmission to the first device based at least partly on the first seed;*

*receiving encrypted data at the first device from the second device; and*

*decrypting the encrypted data at the first device using the encryption key.*

*26. The data encryption method of claim 25, wherein the first device is a host and the second device is a storage device.*

*27. The data encryption method of claim 25, wherein the first device is a computer system and the second device is a mobile device.*

*28. The data encryption method of claim 25, wherein one or both of the first seed and the second seed are 32 bits.*

*29. The data encryption method of claim 28, wherein the encryption key has 8m bits, where m is an integer from 1 to 8.*

*30. The data encryption method of claim 25, wherein said encrypting the first seed comprises using symmetric encryption.*

* * * * *